United States Patent [19]

Sagal

[11] 4,262,440
[45] Apr. 21, 1981

[54] FISHING RIG

[76] Inventor: Amil Sagal, P.O. Box 1357, Moose Jaw, Saskatchewan, Canada

[21] Appl. No.: 78,228

[22] Filed: Sep. 24, 1979

[30] Foreign Application Priority Data

Oct. 13, 1978 [CA] Canada .................................. 313376

[51] Int. Cl.³ ............................................ A01K 97/01
[52] U.S. Cl. ....................................................... 43/16
[58] Field of Search ....................................... 43/15, 16

[56] References Cited

U.S. PATENT DOCUMENTS

| 2,177,912 | 10/1939 | Spitz ......................................... 43/15 |
| 2,799,111 | 7/1957 | Voboril ..................................... 43/15 |
| 2,851,812 | 9/1958 | Beck .......................................... 43/15 |
| 2,924,038 | 2/1960 | Dahlgren ................................. 43/16 |
| 3,474,561 | 10/1969 | McConkey .............................. 43/16 |

FOREIGN PATENT DOCUMENTS 646125  8/1962  Canada ......................................... 43/16

Primary Examiner—Nicholas P. Godici
Attorney, Agent, or Firm—Stanley G. Ade

[57] ABSTRACT

A base includes an offstanding bracing portion and includes a reel holder at one end with a short resilient rod engaged with the base near the reel to carry line from the reel. A trigger device at the other end normally holds the rod down under tension until a fish engages the baited end of the line. The fish pulling on the baited end of the line, releases the trigger device thus enabling the rod to snap upwardly and thus set the hook in the fish's mouth.

3 Claims, 7 Drawing Figures

FISHING RIG

BACKGROUND OF THE INVENTION

This invention relates to new and useful improvements in fishing rigs, and although it is designed specifically for use in ice fishing, nevertheless it is readily adapted for use under normal fishing conditions, if desired.

Normally, ice fishing rigs include means to support a rod and reel and are provided with a flag device or an audible indicator which is activated when a fish applies tension to the baited end of the line which extends downwardly through a hole in the ice.

Such devices are not satisfactory because if not attended, the fish rarely applies sufficient pressure to the baited end in order to set the hook within its mouth and by the time the indicating device has indicated to the fisherman that a fish is biting, the fish has often removed the bait and left the hook.

SUMMARY OF THE INVENTION

The present invention overcomes these disadvantages by providing an ice fishing rig adapted to hold a reel and a relatively short length of rod and which includes a trigger assembly which holds the rod in the bowed or "set" position until a fish bites whereupon the trigger releases and the tension within the rod snaps same upwardly to set the hook in the fish's mouth. If desired, a visual indicator or any other type of indicator can be incorporated with the rod to indicate to the fisherman that the trigger has been released.

One aspect of the invention is to provide a fishing device for ice fishing and the like adapted for use with a reel and fishing line upon said reel; comprising in combination a base, means to mount a reel adjacent one end of said base, a resilient rod section secured by one end thereof to said base adjacent said means to mount said reel, line guiding means on said rod section, said rod section, when in the released position, extending upwardly and forwardly towards the other end of said base, and trigger means adjacent the other end of said base to hold said rod section in a bowed "set" position, said trigger means including means operatively connected to the line to release said trigger means when a predetermined tension is applied to the distal end of said line.

Another advantage of the invention includes means whereby, if desired, the release tension to the trigger assembly can be adjusted within limits.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
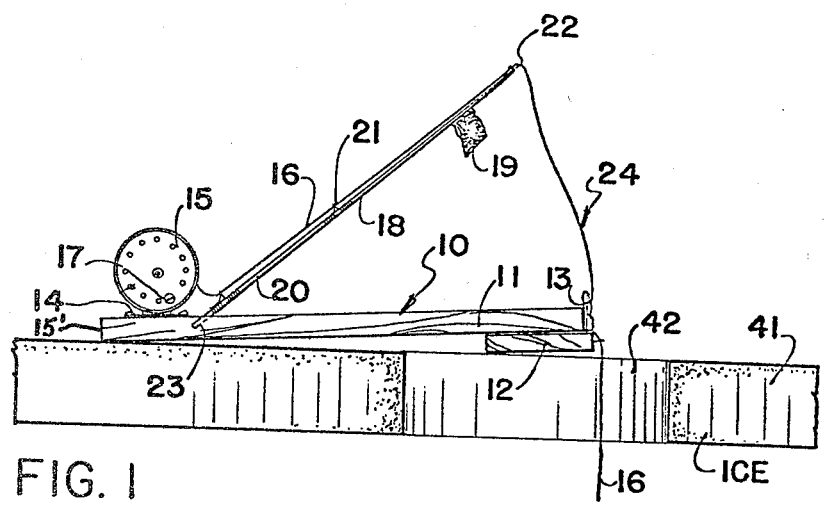
FIG. 1 is a side elevation of the device in the released position.

Proceeding therefore to describe the invention in detail, reference character 10 illustrates generally, a base comprising an elongated base portion 11 and an offstanding bracing portion 12 extending substantially at right angles from one end 13 of the elongated base portion 11.

Conventional means 14 are provided on one end 15' of the base portion 11 to mount a standard reel 15 which contains fishing line 16, and is operated by handle 17 in the usual manner.

A relatively short length of resilient rod 18 is provided and this is preferably a gradually tapering rod thinning out towards the distal end 19 thereof. It is held within the base by the other end 20, adjacent the reel 15 and includes line guides 21 so that line, extending from the reel 15, can extend through the guide to the distal end or tip 22 of the rod section 18. One method is shown of mounting the rod within the base, consisting of a diagonal drilling 23 formed within the base adjacent the reel so that when the rod is inserted therein, it is held frictionally and when in the "released" position shown in FIG. 1, extends upwardly and forwardly in a diagonal manner as clearly illustrated.

Secured to the end 13 of the base 11, is a trigger assembly collectively designated 24. This consists of a plate 25 having a lower portion 26 by which it is secured to the base by means of screw 27. In this connection, an elongated slot 28 is formed through the lower portion 26 so that the screw 27 can be loosened and the entire plate can be pivoted within limits in the direction of double headed arrow 29, thus giving a slight sideways adjustment to the position of the plate which is then fixed by tightening the screw 27. The reason for this will hereinafter be described.

Figure 2:
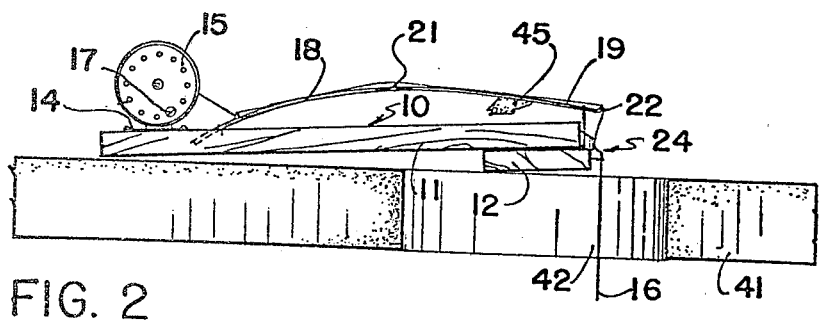
FIG. 2 is a view similar to FIG. 1, but showing the device in the "set" position.

The upper end 30 of the plate 25 curves over to form a hooked portion 31 having a rod receiving underside portion 32, under which the distal end 19 of the rod is held when in the bowed or "set" position illustrated in FIG. 2, it being understood that when in this position, the resiliency of the rod holds it upwardly against the underside of the hooked portion 32. It will also be observed that if the rod is moved outwardly clear of the hooked portion, the resiliency of the rod section will cause it to snap upwardly to the "released" position illustrated in FIG. 1.

A trigger lever is provided collectively designated 33 and includes a substantially vertical portion 34 with an attaching portion 35 formed on the upper end thereof by which it is pivotally secured to the hooked portion 31 through pivot pin 36 and it will be observed that the formation of the lever 34 is such that if it hangs freely from pivot 36, the inner edge 37 passes through or intersects the inner wall of the hooked area 32.

Figure 3:
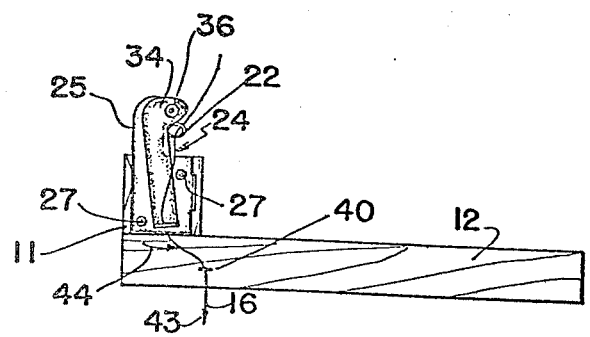
FIG. 3 is a fragmentary end elevation of the base and trigger mechanism.
Figure 4:
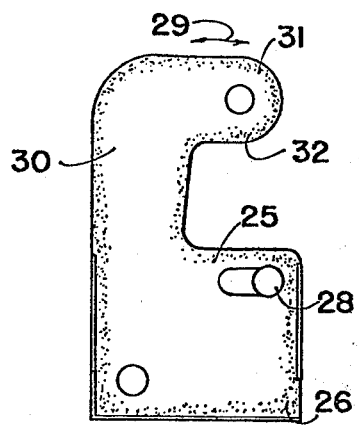
FIG. 4 is a view of the trigger plate per se.
Figure 5:
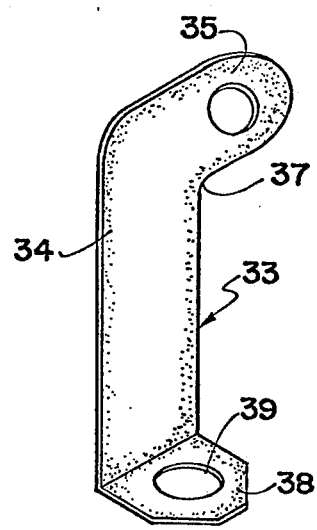
FIG. 5 is an isometric view of the release lever per se.
Figure 6:
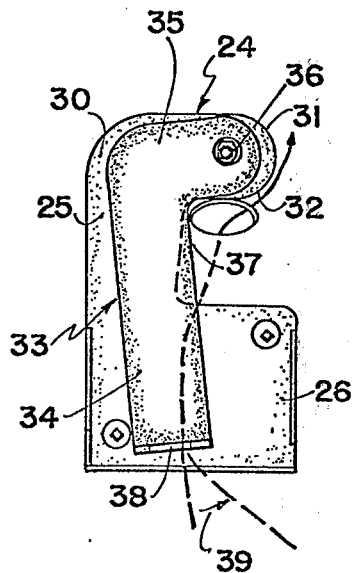
FIG. 6 is an end elevation of the lever and plate secured together.
Figure 7:
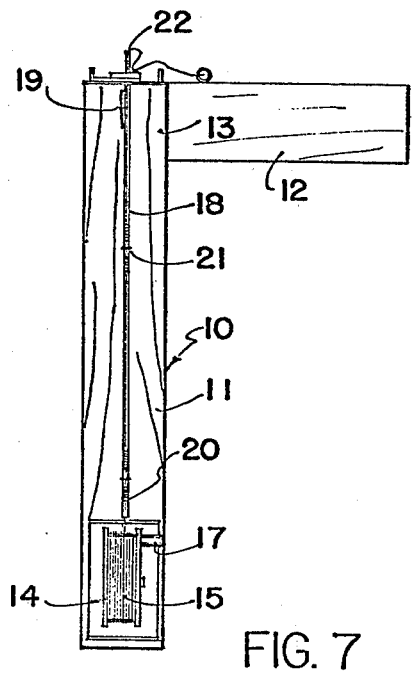
FIG. 7 is a top plan view of the device.

Normally, when the rod is in the "set" position, this inner surface 37 rests against the side of the rod as clearly shown in FIG. 3. The release lever also includes the angulated portion 38 which is provided with an aperture 39 through which the line 16 may run freely.

A line guide 40 is provided within the front of the offstanding base 12 so that the line is guided from the reel 15, through the guides 21 to the distal end guide 22 and thence downwardly through the aperture 39 in the lever 33 and then sideways to the line guide 40 and downwardly into the water below the ice. In this connection, when used on ice as indicated by reference character 41, the offstanding portion 12 spans the hole 42 normally drilled in the ice and supports the fishing rig, it being understood that the main base portion 11 is resting on the ice at one side of the hole 42.

It will be observed that the line guide 40 permits downward tension of the line in the direction of arrow 43, to apply sideways movement to the trigger lever 33 in the direction of arrow 44 and if this tension is sufficient, the lever will dislodge the rod tip from the underside 32 of the hooked end 31 of the plate thus allowing it to snap upwardly to the "released" position and hopefully set the hook in the fish's mouth which is applying the initial tension to the line 16. The aforementioned slight adjustment of the plate provides some adjustment, within limits, of the tension required upon line 16 in order to release the rod tip from the underside 32 of the hooked end 31 of the plate 25.

If necessary, or if desired, a flag 45 may be secured to the rod section adjacent the tip end 22 thereof which will supply visual indication to the fisherman that the rod has been released.

The rod section is easily removed from the base and the offstanding section 12 can, if desired, be pivoted to lie under the main section 11. The reel can be removed and the fishing rig is then readily stored in the minimum of space.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A fishing device for ice fishing and the like adapted for use with a reel and fishing line upon said reel; comprising in combination a base, means to mount a reel adjacent one end of said base, a resilient rod section secured by one end thereof to said base adjacent said means to mount the reel, said rod section being movable from a "set" position to a "release" position and vice versa, line guiding means on said rod section, said rod section, when in the released position extending upwardly and forwardly towards the other end of said base, and trigger means adjacent the other end of said base to hold said rod section in a bowed "set" position, said trigger means including a release lever operatively connected to the line to release said trigger means when a predetermined tension is applied to the distal end of said line, said trigger means including a fixed plate on the end of said base, means on said plate to detachably receive said rod section adjacent the distal end of said rod section, when said rod section is in the "set" position, the tension of said rod section when in the "set" position retaining said rod section within said means on said plate, said plate including a mounting portion, and a hooked upper end formed thereon, said hooked upper end including a substantially vertical portion and an offstanding portion, said plate being situated perpendicular to the longitudinal axis of said rod section, said rod section engaging under said hooked upper end, said release lever comprising a substantially right angled plate having a substantially vertical portion and an upper portion extending at right angles from the upper end of said vertical portion, said release lever being freely pivoted by the distal end of said upper portion, to said offstanding portion of said plate adjacent the distal end thereof whereby said vertical portion of said release lever normally engages the side of said rod section engaging under said hooked upper end and means on said base to guide said line whereby tension on the distal end of said line pulls said release lever sideways against said rod section thereby moving same sideways towards the distal end of said hooked upper end and disengaging same from said plate thereby releasing said rod section to the "release" position.

2. The device according to claim 1 in which said plate is adjustable within limits, releative to said rod section, to control the predetermined tension required to dislodge said rod section from said plate.

3. The device according to claims 1 or 2 in which said base includes a main elongated section, means to mount on said main section, said trigger means being mounted on said main section, and an offstanding section secured to and extending from the end of said main section to which said trigger means is secured, said means to guide said line being situated on said section.

* * * * *